United States Patent
Hung et al.

(10) Patent No.: US 6,353,618 B1
(45) Date of Patent: Mar. 5, 2002

(54) METHOD AND APPARATUS FOR CONTROLLING TRAFFIC FLOWS IN A PACKET-SWITCHED NETWORK

(75) Inventors: Anthony Hung, Plano, TX (US); Hossain Pezeshki-Esfahani, Kanta; Tom Davis, Ottawa, both of (CA)

(73) Assignee: Alcatel Canada Inc., Kawata (CA)

( * ) Notice: Subject to any disclaimer, the term of this patent is extended or adjusted under 35 U.S.C. 154(b) by 0 days.

(21) Appl. No.: 09/244,165

(22) Filed: Feb. 4, 1999

(30) Foreign Application Priority Data

Feb. 12, 1998 (CA) .............................. 2229577

(51) Int. Cl.[7] .................................. H04J 3/02
(52) U.S. Cl. ................... 370/459; 370/235; 370/252; 370/447; 370/461; 370/462; 370/516
(58) Field of Search .................. 370/412, 413, 370/414, 415, 416, 417, 418, 45.9, 233, 234, 235, 252, 253, 447, 458, 461, 462, 516

(56) References Cited

U.S. PATENT DOCUMENTS 6,064,650 A  *  5/2000  Kappler et al. .............. 370/232

FOREIGN PATENT DOCUMENTS

| EP | 0 817 430 A2 | 1/1998 |
| WO | WO 98/06203 | 2/1998 |

OTHER PUBLICATIONS

Zhang, H., "Service disciplines for guaranteed performance service in packet–switching networks", Proc. of the IEEE, vol. 83, No. 10:374–396, 1995.

Wu et al., "Characterizing Traffic Behaviour and Providing End–to–end Service Guarantees within ATM, Networks", Proc. IEEE Infocom, Japan 1997.

Floyd, S. and Jacobson, V., "Link–sharing and resource management models for packet networks", IEEE/ACM Trans. Networking, vol. 3, No. 4:365–386, 1995.

The ATM Forum Technical Committee, "Traffic Management Specification Version 4.0", doc. No. af–tm–0056.000, Apr. 1996.

Hung, A. "Bandwidth Scheduling and its Application in ATM Networks", PhD thesis, U. of Waterloo, 1997.

Goyal et al., "Determining end–to end delay bounds in heterogeneous networks", Proc. 5th International Workshop on Network and Operating System Support for Digital Audio and Video, pp. 273–284, Durham, NH, 1995.

Stiliadis, D. and Varma, A., "A General Methodology for Designing Efficient Traffic Scheduling and Shaping Algorithms", Proc. IEEE INFOCOMM, Japan, 1997.

McDysan & Spohn, "ATM Theroy and Application", © 1995 Mcgraw Hill Inc., pp. 374–383.

* cited by examiner

*Primary Examiner*—Douglas Olms
*Assistant Examiner*—Shick Hom
(74) *Attorney, Agent, or Firm*—Alfred A. Macchione

(57) ABSTRACT

A scheduling device for use in a packet-switched network, belonging to the class of non-work conserving or idling weighted round robin (WRR) arbiters, assigns a packet stream slots in a fixed-length time division multiple access (TDMA) frame by selecting free slots which are closest to ideal slot positions that would, if assigned, eliminate jitter or cell delay variation. The scheduler is able to simultaneously determine if a new constant bit rate connection requiring a predetermined bandwidth conforms to a leaky bucket or GCRA algorithm characterized by a peak packet or cell emission interval T=1/PCR and a packet or cell delay variation time, CDVT, i.e., whether the new connection is GCRA (T, CDVT) conformant. This determination is made by comparing the quantity ME+ML against the CDVT, where ME corresponds to the maximum time or distance by which any assigned slot is earlier than a corresponding ideal slot and ML corresponds to a maximum time or distance by which any assigned slot is later than a corresponding ideal slot. The scheduler can thus also carry out connection admission control (CAC) functions in an ATM network switch.

38 Claims, 6 Drawing Sheets

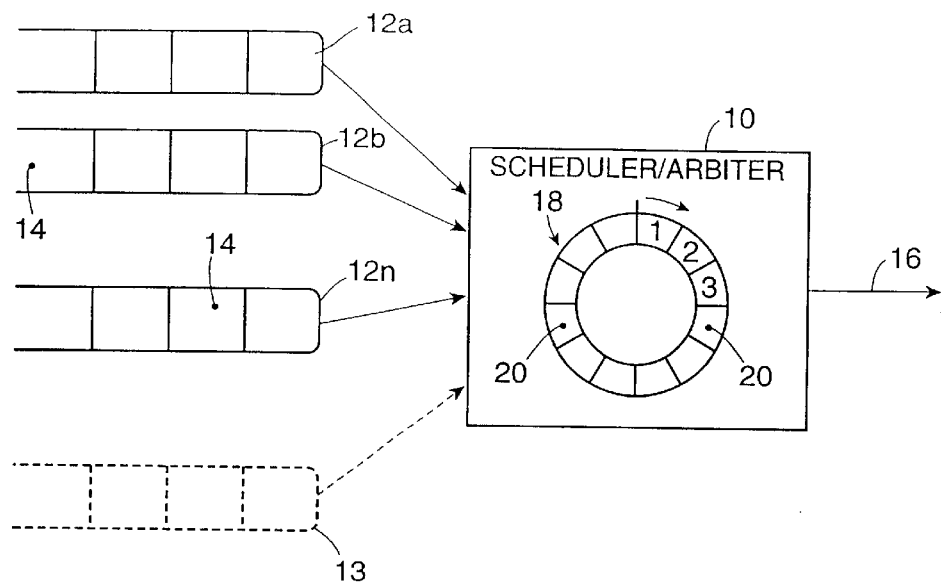
Figure 2
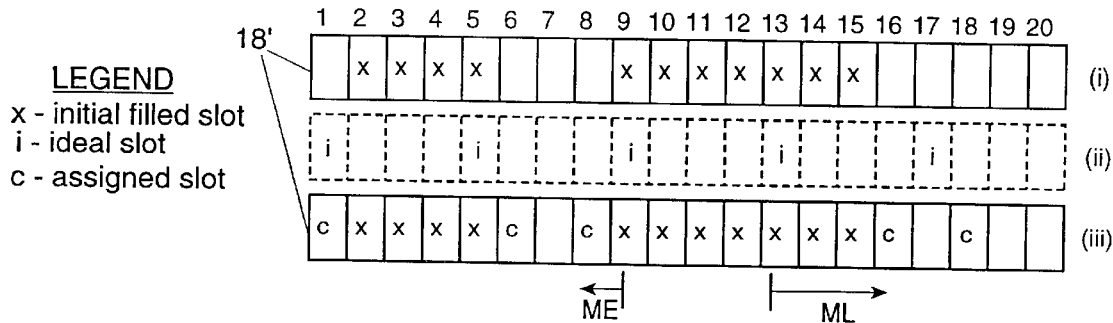
Figure 5A
| Variable \ i | 0 | 1 | 2 | 3 | 4 |
|---|---|---|---|---|---|
| I[i] | 1 | 5 | 9 | 13 | 17 |
| VC[i] | 1 | 6 | 8 | 16 | 18 |
| a | 1 | -∞ | 8 | 7 | 17 |
| b | 6 | 6 | 16 | 16 | 18 |
| ME | 0 | 0 | 1 | 1 | 1 |
| ML | 0 | 1 | 1 | 3 | 3 |
Figure 5B

FIGURE 3

```
100   /*Definition of Constants*/
101       FL      /* the number of slots in the frame*/
102       L       /* the GCRA CDVT parameter that is given*/
103       N_new                               /* the number of required slots for connection*/
104
105   /*Definition of Variables*/
106       Int Array VC[0.. N_new -1]          /* the actual slot assignments*/
107       Int Array I[0.. N_new - 1]          /* the ideal times of slot assignment */
108       Int Fn                              /* the number of free slots*/
109       Int Array F[0.. Fn -1 ]             /* the free slots in sequential order*/
110       Int a, b, i, j, ME, ML              /* free variables*/
111
112       VC[0] ← F[0]
113       remove F[0] from the free list
114       Fn ← Fn - 1
115       I[0] ← VC[0]
116       ME ← 0
117       ML ← 0
118       for i = 1 to N_new - 1
119           I[i] ← VC[0] + i/ ß_new
120           Let j be the largest integer such that F[j] ≤ I[i]
121           if (such a number j exists)
122               j ← min (j, Fn - 1 - (N_new - 1 - i))      /* note 0 ≤ j ≤ F - 1 */
123               a ← F[j]
124           else
125               a ← - ∞
126           endif
127           Let j be the smallest integer such that F[j] > I[i]
128           if (such a number j exists)
129               b ← F[j]
130           else
131               b ← + ∞
132           endif
133           if (I[i] - a - ME < b - I[i] - ML)
134               VC[i] ← a
135               ME ← max(ME,( I[i] - a))
136               remove a from free list
137           else
138               VC[i] ← b
139               ML ← max(ML, (b - I[i]))
140               remove b from free list
141           endif
142           Fn ← Fn - 1
143           if (ME + ML) $\frac{FD}{FL}$ > CDVT)            /* for GCRA conformance only */
144               reject connection
145           end if
146       endfor
```

METHOD AND APPARATUS FOR CONTROLLING TRAFFIC FLOWS IN A PACKET-SWITCHED NETWORK

FIELD OF INVENTION

The invention generally relates to the art of telecommunications traffic management and more specifically to a method and apparatus for controlling traffic flows in a packet-switched network, especially an ATM network, in order to provide constant bit rate service performance.

BACKGROUND OF INVENTION

The concept of a "traffic contract" is well known to those skilled in the art of telecommunications network engineering. Basically, a user or end-station device agrees to transmit packets according to certain pre-defined or negotiated traffic parameters, and in return the network will provide a certain service performance. If, however, the traffic flow from the end-station to the network does not conform to the traffic parameters as specified by a pre-determined conformance algorithm, the network does not have to provide the requested service performance.

The negotiated characteristics of an ATM connection are specified in ATM traffic management protocols, for instance the ATM Forum Traffic Management Specification, Version 4.0, doc. no. af-tm-0056.000, April 1996, which is incorporated herein by reference. These negotiated characteristics include:

(a) the desired service category and QoS parameters, such as the cell loss ratio and delay;
(b) the traffic descriptor, comprising, for instance, the PCR and CDVT, discussed in greater detail below; and
(c) the conformance definition used to unambiguously specify the conforming cells of the connection.

One service category defined by the ATM traffic management protocol is the constant bit rate (CBR) service which provides a connection a static amount of bandwidth that is continuously available during the lifetime of the connection. The requested bandwidth is characterized by the Peak Cell Rate (PCR) value. Another service category is the unspecified bit rate (UBR) service category which also includes a PCR value that the network may try, but does not guarantee, to meet. The PCR is explicitly stated for each ATM connection request. For instance, a switched virtual connection (SVC) call setup message includes an information element (IE) specifying the PCR value.

The CDVT or Cell Delay Variation Time, is a measure of the maximum allowed burstiness of a CBR connection. When packets or cells from two or more connections are multiplexed in a node, cells from a given connection may be delayed while cells of another connection are inserted at the output of the multiplexer. Similarly, some cells may be delayed while physical layer overhead cells are inserted. Consequently, with reference to the peak emission interval, T, which is the inverse of the contracted PCR, some randomness may affect the inter-arrival time between consecutive cells of a connection as monitored at the user-to-network interface (UNI). The upper bound on the degree of permissible clumping or burstiness is the CDVT parameter. Presently, this parameter is not explicitly negotiated when a connection request is received by the network, but rather is implicitly negotiated at subscription time.

The ATM conformance definition employs the Generic Cell Rate Algorithm (GCRA) which is used to define, in an operational manner, the relationship between the PCR and CDVT. The GCRA is defined with two parameters, the Increment, I, and the Limit, L. For CBR service, I=T=1/PCR, and L=CDVT. The GCRA determines for each cell arrival whether or not the cell conforms to the traffic contract of the connection. The GCRA is illustrated in FIG. 1 (original source: page 63 of ATM Forum Traffic Management Specification, Version 4.0, doc. no. af-tm-0056.000, April 1996). The GCRA is equivalent to a leaky bucket controller (LBC) algorithm. Specifically, a stream is GCRA (I, L) conformant if it conforms to an LBC with bucket size $$\sigma = 1 + \frac{L}{I}$$

and token rate $$\rho = \frac{1}{I}.$$

It should be noted that an LBC controller with parameters $(\sigma,\rho)$ ensures that the largest number of conformant cells between any two instances of time $t_1$ and $t_2$ is no more than $\sigma+\rho*(t_2-t_1)$.

An end-station device can be modelled as sourcing a plurality of traffic connections. For example, a wide-area-network may comprise two local-area-networks which are connected through a public ATM network. Each local-area-network comprises a number of workstations which are linked through a concentrator device that multiplexes the traffic streams from the various workstations for transmission over the ATM network. Since a key element of the traffic contract from the perspective of the user or end-station, e.g., the concentrator, is the sequence of cells sent to the network, the end-station will typically employ a scheduler or virtual shaping device which processes the multiplexed source cell stream such that the resultant output toward the network conforms to the traffic parameters specified in the traffic contract.

At the other side of the user-to-network interface, the network typically includes a connection admission control (CAC) function in order to determine whether a connection request should be admitted or denied. As discussed above, a connection request typically defines the source traffic parameters and the requested service performance or quality of service (QoS) class. For a switched connection such as an SVC the connection request occurs at call origination time, and for a permanent connection such as a PVC the connection request occurs when the permanent connection is provisioned. The CAC will only accept the connection request provided that the QoS for existing connections would still be met if the new request is accepted. CAC is typically carried out on a node-by-node basis for switched connections and through a centralized bandwidth management system for permanent connections. For accepted connection requests, CAC determines the configuration of the traffic conformance algorithm, routing, and resource allocation, including trunk bandwidth, buffer space, and internal node resources. It will be appreciated that in order to achieve high switching rates, the CAC must be simple and operate very rapidly.

Once the connection is accepted, the network must typically monitor the connection at the end-station access in order to protect network resources from behaviour which can affect the QoS of other already established connections. This is accomplished by detecting violations of negotiated parameters and taking appropriate actions. In ATM standards, this function is commonly termed Usage Parameter Control (UPC). The UPC typically employs the GCRA for monitoring the connection. However, there are some instances where UPC cannot be applied at the periphery of a network for various reasons.

Network node elements also have the problem of having to shape traffic flows. This is because a network element has to schedule incoming packets or cells from a variety of connections or queues into an outgoing link which interconnects a counterpart network element. The scheduler, arbiter or virtual shaping device of a network element must employ an effective service discipline in order to meet different levels of QoS and bandwidth requirements. For example, the receiving network element may accept only a certain degree of packet clumping or burstiness, i.e., packet or cell delay tolerance, otherwise buffers on the receiving network element would overflow. The network scheduler, arbiter or virtual shaping device should also ideally operate very rapidly in order to achieve high switching rates.

SUMMARY OF INVENTION

Generally speaking, the invention provides a method and related apparatus for scheduling packets in a non-work conserving manner at a queueing point in order to minimize, or at least quantify, the maximum burstiness or jitter of a packet stream.

According to one aspect of the invention, a data communication method is provided for use in a packet-switched network. The method comprises:

(a) receiving packets from a traffic source, such as a connection, and queuing the packets in a memory;

(b) defining a repeating scheduling frame having a duration FD and a total of FL slots;

(c) maintaining an ordered list of free slots;

(d) determining a number, $N_{new}$, of slots needed to satisfy the bandwidth requirement of the traffic source;

(e) identifying a set $\{I[0], I[1], I[2] \ldots I[N_{new}-1]\}$ of ideal slot positions for the traffic source which are spaced apart from each other by a time substantially equal to a peak emission interval between the packets;

(f) selecting a set of assigned slot positions, $\{VC[0], VC[1], VC[2], \ldots, VC[N_{new}-1]\}$, from the list of free slot positions to the connection, wherein the set of ideal slot positions and the set of assigned slot positions have an ordinal one-to-one correspondence and wherein each assigned slot position of the set of assigned slot positions has a position which is approximate or equal to, respectively, its corresponding ideal slot position of the set of ideal slot positions, and wherein each VC[i], where $i \in \{1, 2, \ldots N_{new}-1\}$, is selected from the list of free slot positions so as not to increase the overall burstiness of the connection, and in the event such a free slot position of the list of free slot positions does not exist for a given VC[i], the VC[i] is selected from the list of free slot positions so as to least increase the overall burstiness of the connection; and (g) retrieving the queued packets from the memory and transmitting the retrieved packets only during the relative time periods represented by the assigned slots.

In the preferred embodiment, the overall burstiness of the connection is defined by the quantity (ME+ML)*FD/FL, wherein ME corresponds to a maximum time by which any assigned slot VC[j] is earlier than a corresponding ideal slot I[j], $j \in \{0,1,2, \ldots N_{new}-1\}$, and ML corresponds to a maximum time by which any assigned slot, VC[k], is later than a corresponding ideal slot I[k], $k \in \{0,1,2, \ldots N_{new}-1\}$. In the preferred embodiment, the computational complexity for determining slot assignments for a new connection is proportional to FL, the total number of slots in the frame.

According to another aspect of the invention, a method is provided for determining whether a traffic source which has been assigned a set $\{C[0], C[1], \ldots C[N_{new}-1]\}$ of slots in an FL, $FL \geq N_{new}$, slot scheduling frame of duration FD conforms to a GCRA characterized by a peak packet emission interval, T, and a packet delay variation time, CDVT. The method comprises:

(a) selecting a set $\{I[0], I[1], \ldots I[N_{new}-1]\}$ of ideal slot positions for the traffic source wherein every slot I[j] is spaced apart from slot I[j−1], $j \in \{1, 2, \ldots N_{new}-1\}$, by a time substantially equal to T;

(b) selecting a maximum-valued element, ME, of the set $\{I[k]-C[k]: k \in \{0,1, \ldots N_{new}-1\}\}$, and if this is a negative number, setting ME to zero;

(c) selecting a maximum-valued element, ML, of the set $\{C[k]-I[k]: k \in \{0, 1, \ldots N_{new}-1\}\}$, and if this is a negative number, setting ML to zero; and (d) comparing the quantity (ME+ML)*FD/FL against the CDVT and in response thereto concluding whether the connection conforms to the GCRA.

This aspect of the invention can be used in conjunction with the preferred first mentioned aspect of the invention to iteratively determine, while the slots for a new traffic source are being assigned, whether the new connection will be GCRA conformant. Thus, the invention enables the admittance or rejection of new traffic sources based on whether the calculated CDVT (jitter) exceeds a pre-specified limit. Furthermore, since the complexity of the algorithm is linear in FL, the total number of slots in the frame, this allows for a relatively rapid connection admission control decision.

Another aspect of the invention provides a method for assigning slots in a TDMA frame to a traffic source, wherein the frame has a duration FD and a total of FL slots. The method includes:

(a) determining a number, $N_{new}$, of slots needed to satisfy the bandwidth requirement of the traffic source;

(b) identifying a list A[i]: $i \in \{0, 1, \ldots, N_{new}-1\}$ of preferred slot positions;

(c) assigning a list C[i]: $i \in \{0, 1, \ldots, N_{new}-1\}$ of slots from a predetermined ordered list B of slots for the traffic source which approximate or equal the preferred slot positions, C[i]∀i being selected to be a slot in B which does not increase the overall burstiness of said traffic source, and in the event such a slot does not exist, a slot in B which least increases the overall burstiness of the traffic source; and (d) removing the entries of C from B.

This aspect of the invention can be employed to assign slots to a previously inactive traffic source; i.e., one having no slots allocated thereto. In this case, A is set to a list of ideal slot positions for said traffic source which are spaced apart from each other by a time substantially equal to a peak emission interval between data packets of said traffic source, and B is set to an ordered list of free slots in the frame.

This aspect of the invention can also be employed to assign slots to an active traffic source which requests a reduction in bandwidth. In this case, the traffic source has M slots previously assigned thereto; and $N_{new}$<M. A is set to a list of ideal slot positions for the traffic source which are spaced apart from each other by a time substantially equal to a peak emission interval between data packets of the traffic source, and B is set to a list of the M slots previously assigned to the traffic source. This restricts the assigned slots to those previously allocated to the traffic source and may aid in minimizing disruption.

This aspect of the invention can also be employed to assign slots to an active traffic source which requests an increase in bandwidth. In this case, the traffic source has M slots previously assigned thereto, and $N_{new}$>M. Steps (c)–(d) are preferably carried out two times. The first time, A is set to a list P of the M slots previously assigned to the traffic source and B is set to a list of ideal slot positions I for the traffic source which are spaced apart from each other by a time substantially equal to a peak emission interval between the packets of the traffic source to thereby delete from I those ideal slot positions which are nearest to corresponding slot positions in A and create a list I'. The second time steps (c) and (d) are carried out A is set to I' and B is set to a list of free slot positions. Thereafter, the traffic source is assigned the slots listed in C (as determined the second time) and P. Thus, the assigned slots are those that were previously allocated to the traffic source plus a number of new slots needed to increase the bandwidth to the traffic source.

BRIEF DESCRIPTION OF THE DRAWINGS

The foregoing and other aspects of the invention are described in greater detail below with reference to the following drawings, provided for the purpose of description and not of limitation, wherein:

FIG. 2 is a schematic diagram of the queue arbitration problem that a scheduler, arbiter or virtual shaper device has to manage;

FIG. 3 depicts, in pseudo-code form, a method carried out by the scheduler in accordance with a first preferred embodiment for assigning slots in a scheduling frame to a new connection;

FIG. 5A is a diagram illustrating, with reference to example input, the changing states of schedule frame 18' and the variables employed in the pseudo-code shown in FIG. 3;

FIG. 5B is a chart illustrating, with reference to example input, the changing states of variables employed in the pseudo-code shown in FIG. 3;

Figure 1:
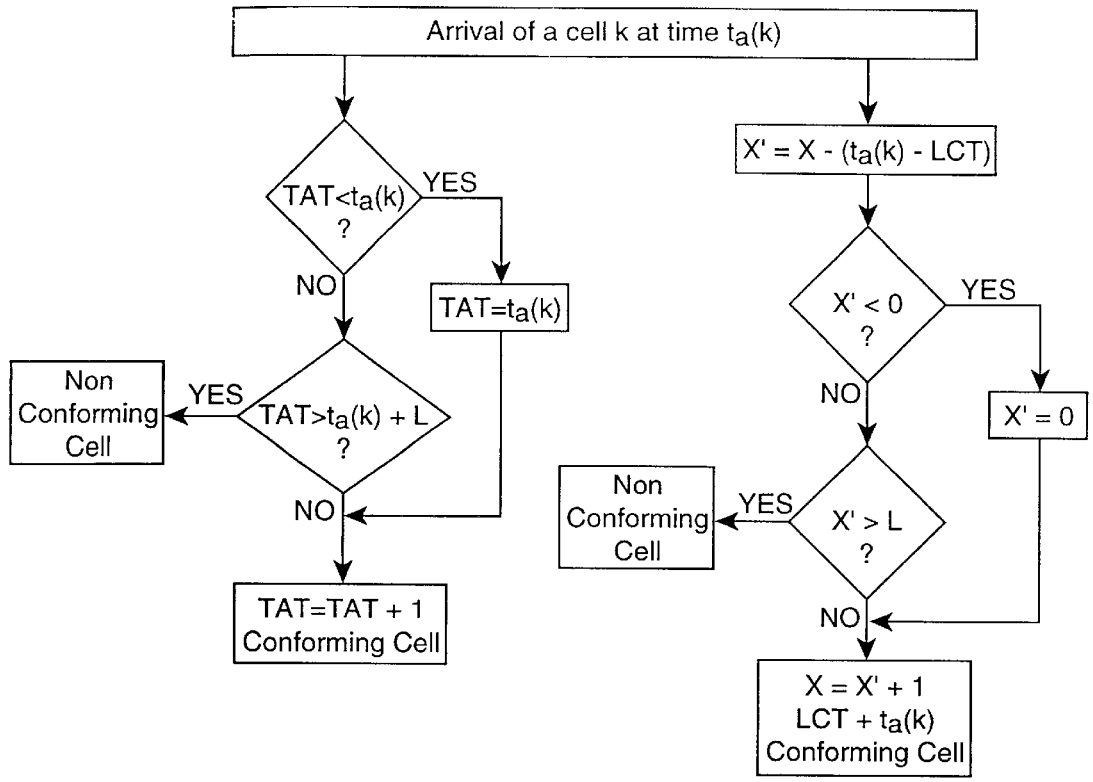
FIG. 1 is a flowchart of the well-known GCRA or leaky bucket algorithm.

In addition, Appendix "A" lists two functions in psuedocode form which are employed by the second preferred embodiment for calculating the CDVT of a traffic source and assigning it a number of slots in the TDMA frame.

DETAILED DESCRIPTION OF PREFERRED EMBODIMENTS

FIGS. 2 to 6 relate to a first preferred embodiment of the invention wherein each packet or cell input stream multiplexed onto a TDMA frame has static bandwidth requirements. For example, as discussed below, each input stream is a single virtual connection requiring a constant bit rate over the life thereof. FIG. 7 and Appendix "A" relate to a second preferred embodiment wherein each packet or cell input stream multiplexed onto a TDMA frame has dynamic bandwidth requirements. For example, as discussed in greater detail below, each input stream is composed of one or more multiplexed virtual connections. In this embodiment the bandwidth of the input stream varies over time as new connections associated with that input stream are established and existing connections torn down.

Discussing now the first preferred embodiment, FIG. 2 models the queue or connection arbitration problem that a scheduler, arbiter or virtual shaper (hereinafter "scheduler") has to manage. As shown in FIG. 2, packets such as ATM cells 14 from a plurality of connections are queued in a plurality of respective per connection queues 12a, 12b, . . . 12n. The function of the scheduler 10 is to schedule the cells 14 from the various connections into an outgoing link 16. The scheduler does so by employing a repeating or repetitive TDMA or scheduling frame 18 having a predetermined frame duration, FD, which is segmented into a fixed number, FL, of slots 20 of substantially equal duration. In the preferred embodiment, the scheduler 10 is non-work conserving, and thus can be characterized as belonging to the class of idling Weighted Round Robin (WRR) schedulers. Some of the slots 20 are categorized as being "free", i.e. the scheduler 10 has not allocated the relative time period represented by a given slot 20 for the transmission of cells 14 from any given queue 12 to the outgoing link 16. Similarly, other slots 20 may be categorized as being "occupied", i.e., the scheduler 10 has allocated the relative time period represented by a given slot 20 for the transmission of cells 14 from a given queue 12 to the outgoing link 16.

Consider now the situation where a new connection, represented by queue 13, must be transmitted to the outgoing link 16. For constant bit rate (CBR) service characterized by a peak cell rate value, PCR, the scheduler 10 must assign a plurality $N_{new}$ of free slots to the connection. $N_{new}$ may be determined with reference to a desired bandwidth P which has been normalized to the channel rate, CR, of outgoing link 16, i.e., $$\beta = \frac{PCR}{CR}.$$

Accordingly, $N_{new}$ may be determined as follows:

$$N_{new} = \text{roundup}(\beta * FL) \qquad (1)$$

From the foregoing, it will be observed that the actual (normalized) bandwidth, $\beta_{new}$, which the scheduler 10 must allocate to the new connection 13 will in most cases be larger than β since the structure of the scheduling frame 18 is such that only a discrete or quantized amount of bandwidth (i.e. an integer number of slots 20) over link 16 can be allocated to a given connection. The value $\beta_{new}$ can be found as indicated by equation (2):

$$\beta_{new} = \frac{N_{new}}{FL} = \frac{\text{roundup}(\beta * FL)}{FL} \qquad (2)$$

In the preferred embodiment, the scheduler 10 assigns $N_{new}$ free slots 20 in the scheduling frame 18 to the new connection 13.

The preferred embodiment also identifies ideal times or slot positions which, if granted to the new connection 13, would provide the required bandwidth such that slots are spaced apart by a time $T_{new}$, which is substantially, although in most cases not exactly, equal to the peak cell emission interval T=1/PCR, as follows:

$$T_{new} = \frac{1}{\beta_{new} * CR} \quad (3)$$

These ideal times or slot positions would, if granted, provide a cell flow that has no cell delay variation time. However, since many of the actual scheduling frame slots 20 corresponding to these ideal slot positions may not be available to the new connection, e.g., being already occupied by a previous connection 12, the preferred embodiment assigns free slots 20 to the new connection 13 which at least approximate the ideal slot positions. This is done in order to avoid the clumping of cells 14 associated with the new connection 13 and hence reduce the amount of burstiness at the output link 16.

The scheduler also optionally determines whether or not the new connection conforms to the GCRA characterized by the parameters I=$T_{new}$≡1/PCR and L=CDVT, i.e., whether or not the connection is GCRA($T_{new}$, CDVT) conformant. Alternatively, the scheduler 10 provides a deterministic mechanism for providing a cell stream with known cell delay variation or jitter.

Figure 4:
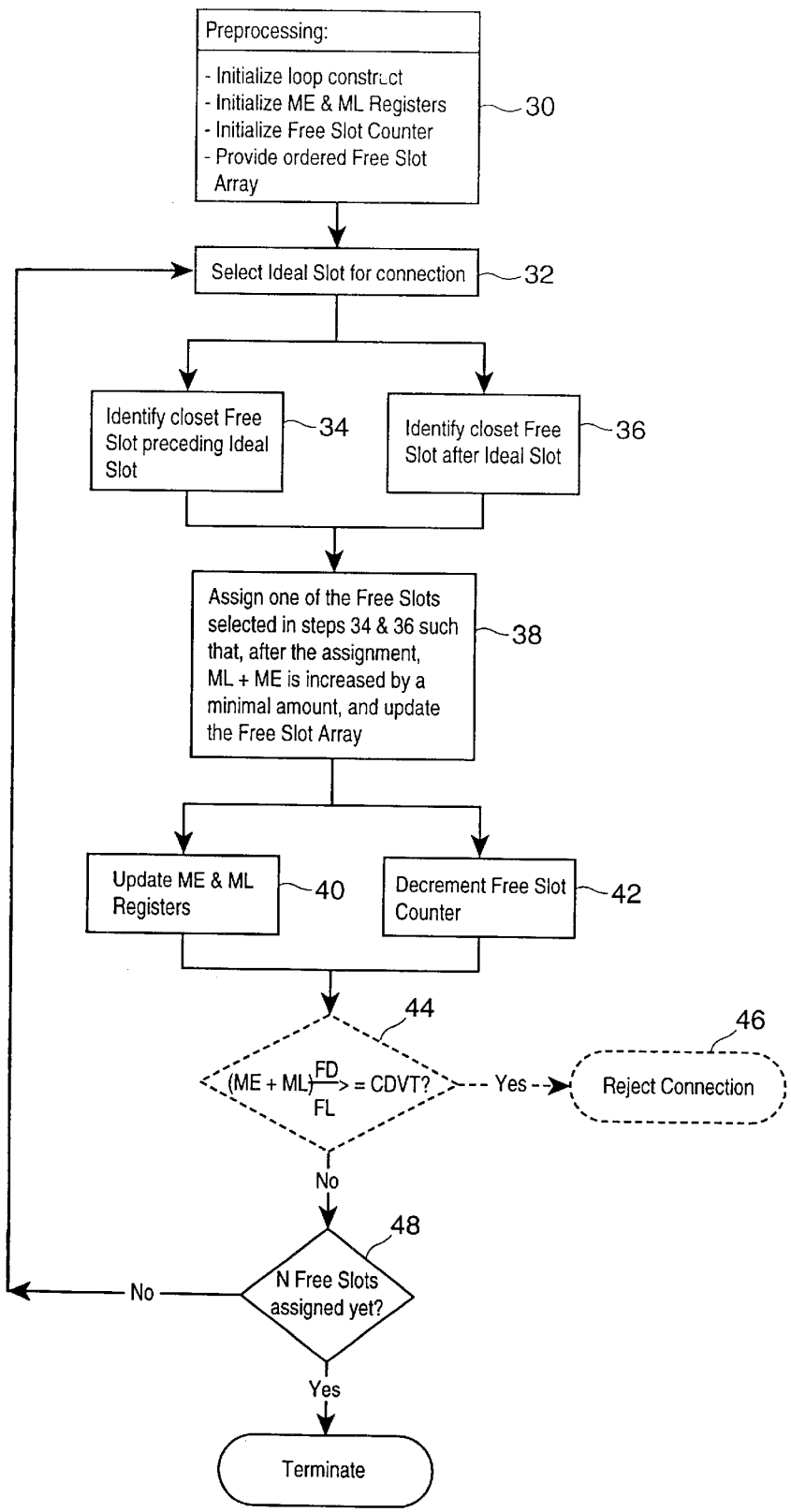
FIG. 4 is a flow chart of the pseudo-code shown in FIG. 3.

The method employed by scheduler 10 according to the first preferred embodiment is shown in pseudo-code form in FIG. 3, and correspondingly in flow-chart form in FIG. 4. The preferred method is discussed by way of example with reference to FIGS. 5A and 5B which diagrammatically illustrate the initial conditions of a hypothetical twenty-slot scheduling frame 18' (FIG. 5A(i)), the changing state of variables employed in the FIG. 3 pseudo-code (FIG. 5B), ideal slot positions for the new connection (FIG. 5A(ii)), and the final state of the scheduling frame 18' (FIG. 5A(iii)).

Referring to these figures, in a first pre-processing step 30, which corresponds to lines 100–117 of the FIG. 3 pseudo-code, a number of constants and data structures are defined as indicated in the pseudo-code. With reference to the example initial conditions illustrated in FIGS. 5A and 5B, example values for these constants and data structures are as follows:

| Initial Conditions |
| --- |
| FL = 20 (the length or number of slots in the scheduling frame 18') |
| L = given (the GCRA CDVT value which is given) |
| $N_{new}$ = 5 (the number of slots 20 required for new connection 13) |
| Fn = 9 (the number of free slots 20) |
| Variables a, b, i, j = null (temporary variables) |
| Array I [0 . . . $N_{new}$-1] = {null} (the ideal times or slot positions) |
| Array VC [0 . . . $N_{new}$-1] = {null} (the actual slot assignments) |
| Variables ME and ML = null (registers for (a) the maximum number of slots by which any I[j] is earlier than a corresponding VC[j], j∈ {0,1,2 . . . $N_{new}$-1}; and (b) the maximum number of slots by which any I[k] is later than a corresponding VC[k], k∈ {0,1,2 . . . $N_{new}$-1}) |
| Array F[0 . . . Fn-1] = {F[0] = 1, F[1] = 6, F[2] = 7, F[3] = 8, F[4] =16, F[5] = 17, F[6] = 18, F[7] = 19, F[8] = 20} (ordered array of free slot positions) |

From the foregoing, it will be observed that the example new connection 13 requires five free slots 20.

In step 32 of the FIG. 4 flowchart, corresponding to pseudo-code line 117, an ideal slot position I[i] is selected. Preferably, the first ideal slot position I[0] is selected to be the first free slot F[0], as indicated in pseudo-code line 112 and 115. Thereafter, as indicated in pseudo-code line 117, subsequent ideal slot positions are spaced apart from each other by a distance of 1/$\beta_{new}$ which, as will be seen from equation (3), substantially equals T, the peak cell emission interval of the new connection 13. In the present example, the ideal slot positions are located at a distance of $$\frac{1}{\beta_{new}} = \frac{FL}{N_{new}} = \frac{20}{5} = 4$$

slot units away from each other, as shown in FIG. 5A(ii). (Note also that the algorithm permits the ideal slot spacing to be a rational number.)

In steps 34 and 36, which correspond to pseudo-code lines 120–132, the closest free slots which respectively precede a nd come after the ideal slot position I[i] selected in step 32 are identified. For example, referring to FIG. 5A(i) and 5A(ii), the time corresponding to the beginning of slot no. 5 is identified as an ideal slot position in the first iteration of the loop, i.e. I[1]=5. There is no preceding free slot (since slot no. 1 has already been allocated) and hence variable a is assigned the value–∞ (see FIG. 5B). The closest free slot after ideal slot no. 5 is slot no. 6, and hence variable b is assigned the value 6 (see FIG. 5B).

In step 38, which corresponds to pseudo-code lines 133, 134, 136, 137, 138 and 140, one of the free slots selected in steps 34 and 36 is assigned or allocated to the new connection 13, and the selected free slot is then removed from the list or array of free slots. In the preferred method, if both of the free slots selected in steps 34 and 36 have relative distances to the ideal slot position which are within envelopes or maximum relative distances defined by the above-described ME or ML registers, as applicable, then either free slot can be allocated to the new connection. This ensures that the overall burstiness of the new connection 13 as computed during earlier iterations is not increased. If, however, one or both of the free slots selected in steps 34 and 36 are not within the ME or ML envelopes, the new connection is allocated th e free slot which, when assigned, will minimize the value of ME+ML. This will minimize the overall burstiness of the new connection. For example, during the second iteration of the loop, i.e. i=2, the ideal slot position I[2] is equal to 9, a=8 and b=16. Neither of the closest selected free slots a and b are within the envelopes respectively defined by the ME and ML registers. Slot a would give a new ME of 1 instead of the current 0. Slot b would give a new ML of 5 instead of the current 1. However, since slot a yields an ME+ML value less than slot b, slot a is assigned to the new connection. Slot a is subsequently removed from the array F of free slots or otherwise marked as being no longer available.

In step 40 of the FIG. 4 flowchart, which corresponds to pseudo-code lines 135 and 139, the ME and ML registers are respectively updated to reflect the maximum relative distance any given VC[j] precedes I[j], j∈{0,1, 2, . . . $N_{new}$-1} and the maximum relative distance any given VC[k] precedes I[k], k∈{0,1, 2, . . . $N_{new}$-1}. FIG. 5A(iii) diagrammatically illustrates the final values of ME and ML in the present example.

In step 42, which corresponds to pseudo-code line 142, the free slot counter Fn is updated.

In step 44 of the FIG. 4 flowchart, which corresponds to pseudo-code lines 143–145, the quantity (ME+ML)*FD/FL is tested against the CDVT. This comparison, as explained in greater detail below, is used to determine, on an iterative or global basis, whether or not the slots assignments for the new connection 13 are GCRA ($T_{new}$, CDVT) conformant. If the comparison at step 44 is true, the new connection is rejected at step 46. Otherwise, step 48 determines whether or not another iteration of steps 32–44 is required in order to allocate sufficient slots to the new connection 13.

It will be observed from the foregoing that the preferred method attempts to space out the slot assignments for the new connection 13 in a manner which reduces the cell delay variation or burstiness at the output link 16. The preferred method searches for a set of $N_{new}$ slots in an iterative manner wherein, at each iteration, an attempt is made to reduce the overall burstiness of the assigned slots. This is possible because, at each iteration, the preferred method calculates the burstiness, defined by (ME+ML)*FD/FL, of the assigned slots up to that point for any choice of slot assignments. Hence, the preferred method can make an intelligent choice in the selection of the next slot.

While not intending to be bound by any one theory, the comparison of ME and ML against the CDVT is deemed sufficient to determine whether the connection is GCRA ($T_{new}$, CDVT) conformant on the basis of the mathematical analysis which follows.

Analysis:

A connection is given a stream of slots on which to transmit. Let d[i] denote the scheduled time of the $i^{th}$ slot, and let I[i] denote the ideal scheduled time of the $i^{th}$ slot:

$$I[i]=d[1]+(i-1)\beta_{new}^{-1}, i\in\{1, 2, \ldots\}. \quad (4)$$

Now let the GCRA theoretical arrival time (TAT) as indicated in FIG. 1 be defined as:

$$TAT[i]=\max\{TAT[i-1]+\beta_{new}^{-1}, d[i]\}, i\in\{2, 3, \ldots\}, \quad (5)$$

$$TAT[1]=d[1]. \quad (6)$$

By this definition, d[i]≤TAT[i].
Let j be the smallest i such that d[i]=TAT[i] and d[k]<TAT[k] for all k>i, and let ML=d[j]−I[j]. So, for all i≥j, $$TAT[i] = d[j] + (i-j)\beta_{new}^{-1} \quad (7)$$

$$= I[j] + ML + (i-j)\beta_{new}^{-1} \quad (8)$$

$$= I[i] + ML \quad (9)$$

By the definition in the GCRA, the CDVT of a CBR connection satisfies CDVT≥TAT[i]−d[i] for all i. We can calculate this bound on TAT[i]−d[i] by defining a variable ME=$\max_i$\{I[i]−d[i]\} and using (9), for all i≥j, $$TAT[i]-d[i]=I[i]+ML-d[i] \quad (10)$$

$$\leq ML+ME \quad (11)$$

So, L=ML+ME≡CDVT is sufficient for GCRA conformance.

The final part of this analysis shows how ML and ME can be calculated. Note that the schedule times follow a periodic pattern:

$$d[i+kN_{new}]=d[i]+k\times FL, i\in\{1,2\ldots\}k\in\{0\ 1, 2\ldots\}. \quad (12)$$

So, $$I[1+kN_{new}]=d[1+kN_{new}]; \quad (13)$$

and hence $$d[i]-I[i]=d[i+kN_{new}]-I[i+kN_{new}] \quad (14)$$

Finally, then, we can assign $$ME \leftarrow \max\{0, \max_{1\leq i\leq N}\{I[i]-d[i]\}\} \quad (15)$$

$$ML \leftarrow \max\{0, \max_{1\leq i\leq N}\{d[i]-I[i]\}\} \quad (16)$$

and $$CDVT \leftarrow (ME+ML)*FD/FL \quad (17)$$

Therefore, the values ML and ME can be found by observing the maximum differences between the ideal scheduled times and the scheduled times of a single frame (the first frame).

Figure 6:
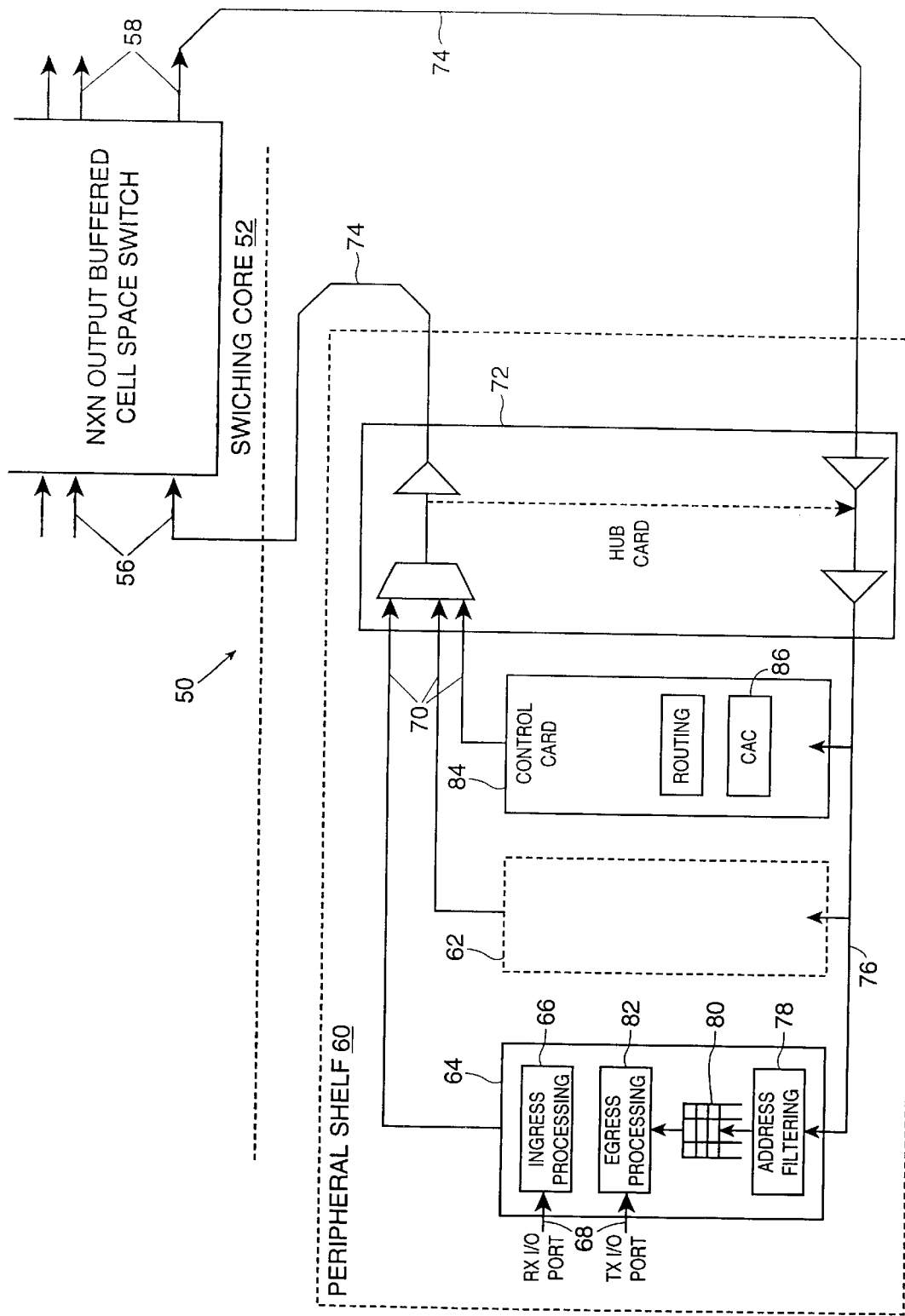
FIG. 6 is a block diagram of one embodiment of a network switch which incorporates the scheduler of the first preferred embodiment.
Figure 7:
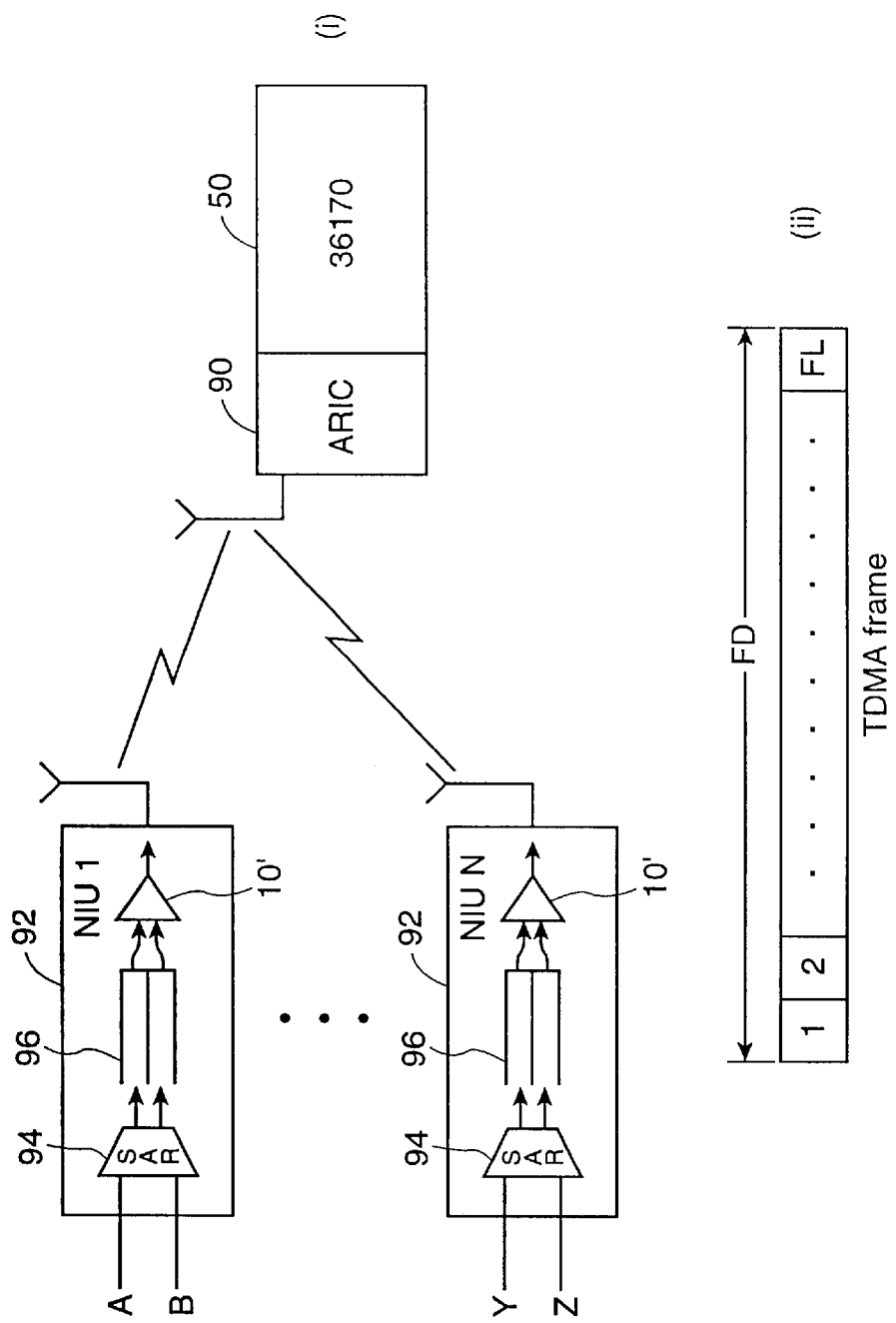
FIG. 7 is a block diagram of another embodiment of a network switch having a wireless user-to-network interface and which employs a scheduler according to a second preferred embodiment for assigning slots in a wireless time division multiplexed access (TDMA) frame in order to effect an uplink from end-stations to the network.

FIG. 6 illustrates the architecture of a preferred network switch 50, commercially available as the model 36170 MainStreet Xpress™ switch from Newbridge Network Corporations of Kanata, Ontario, Canada, which may incorporate the scheduler 10. The switch comprises a high capacity switching core 52 having N inputs 56, any of which can be switched to any or all of N outputs 58. The switch 50 further comprises one or more accessory or peripheral shelves 60 (only one being shown) which feature a plurality of universal card slots (UCS) 62 for housing interface cards or system cards.

One example of an interface card is cell relay card 64. Card 64 comprises an ingress processing means 66 for converting, if necessary, incoming data from the input side of port 68 into ATM-like cells. The ingress processing means 66 also examines the VPI/VCI field of the ATM cell and, based on this field, attaches an internal tag or header to the ATM cell which is used to identify an internal address that the ATM cells should be routed to. The ATM cell including the priority tag is then routed toward the switching core 52 over an "Add" bus 70.

A hub card 72, which is one type of system card, multiplexes a plurality of Add buses 70 from the various interface cards on shelf 60 to a high speed "intershelf link" (ISL) bus 74 which connects the shelf 60 with the switching core 52. The hub card also terminates the ISL bus 74 from the switching core 52 and drives a multi-drop bus 76. In this manner, any interface or system card can communicate with any other interface or system card.

The cell relay card 64 includes a backplane or address filtering means 78 for monitoring the multi-drop bus 76 and copying or receiving any data cell thereon which is addressed to the card 64. The multi-drop bus 76 operates at a relatively high speed, e.g., 800 Mb/s, and thus the card 64 may receive more ATM data cells then it can instantaneously deal with. In order to prevent cell loss, card 64 includes an output queueing means 80 for buffering outgoing cells. An egress processing means 82 retrieves cells from the queues established by the queueing means 80 and maps the cells into the specific format of the interface for transmission on the output side of port 68. Further details concerning the architecture and operation of the switch 10 can be found in PCT publication no. WO 95/30318 owned by the assignee of the instant application and published Nov. 9, 1995, which is incorporated by reference herein.

The switch 50 also includes a system control card 84 which sits in one of the UCS slots 62. The control card comprises a connection and admission control (CAC) means 86, as known heretofore in the art, for determining whether or not a new connection should be accepted. Thus, for example, when the card 64 receives an SVC signalling call set-up message, the ATM cells thereof are routed to the control card 84 for CAC processing.

In practice, the scheduler 10 is preferably executed by the CAC means 86 whenever a request for a new connection is encountered. As will be noted from the foregoing, the preferred method can determine on an iterative basis, whether or not the new connection is GCRA($T_{new}$, CDVT) conformant. This requires a computational complexity proportional to FL, the number of slots in the scheduling frame 18. At the same time, the preferred method provides the slot assignments for the new connection. These slots assignments are used by the egress processing means 82 in order to schedule the transmission of data cells on the output of port 68 from the queueing means 80.

Discussing now the second preferred embodiment, FIG. 7 illustrates the network switch 50 configured for use in a wireless communication environment. In this embodiment, as shown in FIG. 7(i), one of the UCS slots 62 is occupied by an ATM radio interface card (ARIC) 90 which communicates over an air channel with a plurality of network interface units (NIUs) 92. Transmission from the ARIC 90 to the NIUs 92 is accomplished via a broadcast mode. In the reverse direction, however, the air channel is made available to the NIUs according to a TDMA discipline, as shown in FIG. 7(ii). Each NIU 92 terminates a number of connections, such as T1 data streams shown as inputs A, B, . . . Y, Z. Each NIU includes a segmentation and reassembly (SAR) module 94 as known in the art for segmenting the incoming data streams into ATM cells, which are queued in memory 96 and then multiplexed by a scheduler 10' into a single cell stream. The scheduler 10' transmits the cells of this cell stream during the time slots assigned to the NIU. The system thus resembles a two level concentrator in the uplink direction. It should be noted that in contrast to the application described with reference to the first preferred embodiment, in the present application the number of slots that an NIU requires is not static in nature but rather dynamic, and will increase or decrease as connections to the NIU are respectively set up or torn down.

In the second preferred embodiment the CAC means 86 calculates the slot assignments and the CDVT for each NIU 92 requesting bandwidth. The CDVT is compared to a predetermined limit and the bandwidth request is accepted or rejected. Once accepted, the slot assignments allocated by the CAC are communicated to the requesting NIU via the ARIC. The TDMA structure is thereafter employed to ensure that all cells are GCRA conformant after being transmitted on the TDMA frame, and the network switch 50 does not use a UPC device to monitor the end-station access to the network.

Appendix A lists two functions in pseudocode form which are employed by the system of the second preferred embodiment. The function calculate_CDVT() calculates, in and of itself, the CDVT of a given sequence of time slots and will be readily understood given the previous discussion. The function nearest( ) is similar to the algorithm presented in FIG. 3, particularly with respect to lines 70–104, but includes code at lines 48–69 and 105–118 which, as described thereat, facilitate the choice of an ideal slot position other than the first free slot of the TDMA frame. Hence, the first slot assigned to a previously inactive NIU is not necessarily the first free slot. This feature assists in dispersing slot assignments over the TDMA frame for the various NIUs, which is particularly useful when the bit rates of their output cell streams are similar in magnitude.

The preferred procedures for assigning slots to an inactive NIU, removing slots from an active NIU, and adding additional slots to an active NIU are described below.

Adding Slots to a Previously Inactive NIU

N is the number of slots required by the NIU and F is the list of free slots.

1. Choose an index k into the list of free slots F, preferably by choosing it randomly uniformly in the range 0≦k<length(F).
2. Create an array of ideal times or slot position I as follows:
   for 0≦i<N $$I[i] \leftarrow F[k] + i \times \frac{FL}{N}$$

endfor

Steps 1 and 2 facilitate the dispersion of the ideal slot positions, and hence the assigned slot positions which attempt to track the ideal slot positions, over the TDMA frame.

3. Make the call: nearest(I, F, NULL, 0, 0, k), and set S←C where C is the returned vector that specifies the slot assignments. When this function is called using the foregoing arguments the processing is quite similar to the algorithm discussed in connection with the first preferred embodiment. More particularly, the function finds those free slots in F which are closest to the list of ideal slot positions I.
4. Call the function: calculate_CDVT (S, FL, FD). The function returns ME+ML, and the CDVT is calculated as $$(ME + ML) \times \frac{FD}{FL}.$$

Removing Slots from an NIU

Let S be the vector of time slots currently allocated to the NIU. Let M<length(S) be the new number of slots needed by the NIU. Then:

1. Choose an index k into S, preferably by choosing k randomly uniformly in the range 0≦k<length(S).
2. Construct a vector of ideal times I as follows
   for 0≦i<M $$I[i] \leftarrow S[k] + i \times \frac{FL}{M}$$

endfor
3. Make the function call nearest (I, S, NULL, 0, 0, k). This step can be intuitively understood by considering the list of slot assignments S as the "free" slots from which a reduced number of pre-existing slots are selected for the reduced bandwidth requirements of the NIU. When the function returns the vector S contains the pre-existing slots assigned to the NIU which are no longer needed, therefore return the entries of S to the list of free slots F, and store the returned vector: S←C. It will be appreciated that an alternative procedure is to release all of the pre-existing slots assigned to the NIU and then re-execute the procedure for adding slots to an inactive NIU. However, once a series of slots have been assigned to an NIU it is preferred to limit the selection of slots which approximate the ideal slot positions to the group of previously assigned slots in order to minimize disruption.
4. Call the function calculate_CDVT (S, FL, FD), and store $$CDVT \leftarrow (ME + ML) \times \frac{FD}{FL}.$$

Adding Slots to an Active NIU

Let S be the vector of time slots currently allocated to the NIU. Let M>length(S) be the new number of slots needed by the NIU. Take the following steps:
1. Choose an index k into S (e.g., by choosing it randomly uniformly in the range 0≦k<length(S)).
2. Construct a vector of ideal times I corresponding to the new bandwidth by:
   for 0≦i<M $$I[i] \leftarrow S[k] + i \times \frac{FD}{M}$$

endfor
3. Make the function call nearest(S, I, F, 0, 0, k) and discard the returned vector C.
4. Choose an index j into I (e.g., by choosing it randomly uniformly in the range 0≦j<length (F)).
5. Find k such that F[k] is closest to I[j].
6. Use the values of ME and ML obtained from step 3 to make the function call: nearest (I, F, NULL, ML, ME, k). Store the returned vector C. Note the reversal of ME and ML when used as input to the second call to nearest( ).
7. Merge C and S into a vector with its entries in the ascending order and return the resulting vector in S. Note that this is possible in a time proportional to FL as the two vectors being merged are already ordered.
8. Call the function calculate_CDVT(S,FL,FD), and store $$CDVT \leftarrow (X + Z) \times \frac{FD}{FL}.$$

It will be appreciated that in the alternative to the above procedure M slots could be assigned to the NIU by releasing all of the slots previously assigned to the NIU and then executing the procedure for adding slots to an inactive NIU.

However, it is preferred not to release the pre-existing slot assignments for the reasons described above. The preferred procedure accommodates this goal, as follows. In steps 1 and 2, a list of M ideal slot positions are identified for the new increased bandwidth requirements. In step 3, the function nearest() is called a first time. Note that the function nearest(A, B, . . . ) essentially identifies the entries in the second argument B that most closely match those in the first argument A, and deletes such entries from B. In adding slots to an active NIU, it is necessary to increase the slot assignments to M=N+m, where N is the number of pre-existing assigned slots and m is the number of additional slots required. Since it is desired not to alter the pre-existing slot assignments, it is necessary to delete N slot positions from the list of M ideal slot positions. By making the call nearest(S, I, F, 0, 0, k), wherein vector I is passed as argument B, the N ideal slot positions which are "nearest" to the pre-existing assigned slots are deleted from the list of ideal slot positions. Once step 3 is carried out, there are still m entries in the list of ideal slot positions which must be chosen from the free list. Thus in step 6 nearest( ) is called a second time but this time slots are deleted from the list of free slots.

The first preferred embodiment described above assigned the first free slot in a scheduling frame to a new connection and also identified the first ideal slot as the first free slot. The second preferred embodiment enabled the first assigned slot to be more randomly selected from the choice of free slots. Those skilled in this art will realize that these methods are not necessarily optimal with respect to generating a cell flow having the lowest possible cell delay variation (i.e. ML+ME). One way to improve the performance of the preferred embodiments is to repeat the preferred methods for different choices of free slots as starting times to generate a variety of slot assignment sets and then select the assignment set which provides the least cell delay variation. In particular, the search can be limited to the free slots that are within roundup($\beta_{new}$*FL) of F[0]. The decision as to whether or not to employ this modification will depend upon real-time processing constraints in call processing and connection admission control. Similarly, those skilled in the art will appreciate that numerous other modifications and variations may be made to the preferred embodiment without departing from the spirit of the invention.

---

APPENDIX "A"

Function: calculate_CDVT(S, FL, FD)
/* This function calculates the CDVT of any sequence of time slots.
Inputs    A vector of time slots S
             Frame Length FL
             Frame duration FD.
Outputs   Maximum lag behind ideal times ME (in units of slot duration).
             Maximum lead before ideal times ML (in units of slot duration).
             Maximum variation L of the sequence about "ideal times " (in units of seconds), i.e. CDVT.
*/

Set: $Inc - \frac{FL}{length(S)}.$

Set: ME ← 0 and ML ← 0.
for 0 ≦ i < length(S)
    I ← S[0] + i × Inc
    ME ← max (ME, S[i] − I)
    ML ← max (ML, I − S[i])

-continued

APPENDIX "A"

```
        endfor
        ME ← max (ME, 0)
        ME ← max (ML, 0)
```
Return ME, ML and $(ME + ML) \times \dfrac{FD}{FL}$.

Function: nearest (A, B, F, ME, ML, i*)
/* The function matches the entries in vector A to those in vector B while heuristically aiming for a small CDVT. The function can intuitively be understood to work as follows: Given a "preferable" sequence of time slots A, and a list of slots B to which the selection is limited, the function makes a selection of the available slots in B while trying (heuristically) to make the CDVT of the selected sequence as small as possible. For instance, when adding N slots to a previously inactive NIU, the crucial step is the function call nearest (I, F, NULL, 0, 0, k), where I is the list of "ideal" times and F is the list of "free slots".

Inputs:    A is a vector whose entries the function would prefer to accept as they are.
           B is the vector to which the function limits its selection of slots.
           F is either a NULL pointer or points to the list of free slots according to the following usage: When removing slots from an active NIU or assigning them to a previously inactive NIU, this argument must be set to NULL. When adding more slots to an existing NIU, the function is called twice, in the first call this argument must point to the list of free slots.
           Previous values of (the real numbers) ME and ML is any.
           i* is an initial index into vector B. The function has no specific requirement for choosing i*. One possibility is to choose i* randomly uniformly in the range $0 \leq i^* $ length(B).
Note:      It is an error to invoke the function if length (A) > length (B).
Outputs:   Vector C is created. It contains the slots which were initially in B that are closest to those slot positions in vector A.
           Vector B is modified. The slots nearest to those slot positions in vector A are deleted from vector B.
           Updates values ME and ML are also returned. */

/* To facilitate arithmetic when i* ≠ 0, the vector A, B, and F, are shifted, so that B[i*], becomes B[0]. When the selection of slots has been made the vectors are rotated back to the original reference. */
Store Shift ← B [*]
for 0 ≤ i < length(A)
        A[i] ← (A[i] – Shift) mod FL
endfor
/* Note that if a ≥ 0 and b > 0, then (–a) mod b = ((b – 1 × a) mod b. */
Arrange A in ascending order.
/* Note that this consists in simply "rotating" the entries of A so that the smallest entry is in A[0] and is therefore 0[FL]. As opposed to a "sort" function which could be 0(FL × log (FL)). */
for 0 ≤ i length (B)
        B[i] ← (B[i] – Shift) mod FL
endfor
Arrange B in ascending order
if F ≠ NULL
        for 0 ≤ length(F)
                F[i] ← (F[i] – Shift) mod FL
        endfor
        Arrange F in ascending order
endif
Set j* ← 0.
Set C[0] ← B[0]
for 0 ≤ i < length(A)
        if(i == 0∥F == NULL)
                I ← ∞
                k ← 0
        else
                Let I be the largest integer such that F[I] A[i]
                Let k be the smallest integer such that F[k] > A[i – 1]
        endif
        Let j1 be the largest integer such that B [j1] ≤ A[i] and j1 < j* + 1 – k
        If(such a number j1 exists)
                j1 ← min (j1, length (b) – length (A) + i)
                a ← B[j1]
        else
                a ← –∞
        endif
        Let j2 be the smallest integer such that B(j2] > A[i] and j2 < j* + 1 – k
        is (such a number j2 exists)
                b ← B[j2]
```

-continued

APPENDIX "A"

```
else
            b ← ∞
        endif
        if (A[i] - a - ML < b - A[i] - ME)
            C [i] ← a
            ML ← max (ML, A[i] - a))
            j* ← j1
            remove a from B
        else
            C[i] ← b
            ME ← max (ME, b - A[i]))
            j* ← j2
            remove b from B
        endif
endfor
for 0 ≦ i < length(A)
        A[i] ← (A[i] =+ Shift) mod FL
endfor
Arrange A in ascending order.
for 0 ≦ i < length(B)
        B[i] ← (B[i] + Shift) mod FL
endfor
Arrange B in ascending order.
if F ≠ NULL
        for 0 ≦ i < length(F)
                F [i] ← (F[i] + Shift) mod FL
        endfor
        Arrange F in ascending order
endif
Return Vectors C and B (which has by now been modified). Also return ME and ML.
```

What is claimed is:

1. A method for determining whether a packet stream which has been assigned a set of N assigned slot positions in a slot scheduling frame having FL slots, where FL≧N conforms to a predetermined conformance algorithm characterized by a peak packet emission interval and a packet delay variation time, said method comprising the steps of:

(a) selecting a set of N ideal slot positions for said packet stream wherein said ideal slot positions are spaced apart from each other by a time substantially equal to said peak packet emission interval and wherein each assigned slot position of said set of N assigned slot positions ordinally corresponds to a respective ideal slot position of said set of N ideal slot positions;

(b) determining a value ME, corresponding to a maximum amount by which each said assigned slot position is earlier than its said respective ideal slot position;

(c) determining a value ML, corresponding to a maximum amount by which each said assigned slot position is later than its said respective ideal slot position; and (d) determining, based on a quantity ME+ML and said packet delay variation time, whether said packet stream conforms to said predetermined conformance algorithm.

2. The method according to claim 1, wherein said FL slots of said slot scheduling frame have substantially equal fixed time durations and said packet stream comprising packets of a fixed length.

3. A method for determining whether a constant bit rate packet stream conforms to a predetermined conformance algorithm characterized by a peak packet emission interval and a packet delay variation time, said packet stream being assigned a set of assigned slot positions, $\{C_1, C_2, \ldots C_{N-1}, C_N\}$, in a slot scheduling frame having FL slots, where FL≧N, and wherein each position $C_i$, where $i \in \{1, 2, \ldots N\}$, corresponds to a time value representative of a transmission time of the $i^{th}$ assigned slot position of said set of assigned slot positions, said method comprising the steps of:

(a) selecting a set of ideal slot positions, $\{I_1, I_2, \ldots I_{N-1}, I_N\}$, for said packet stream wherein each position $I_i$, where $i \in \{1, 2, \ldots N\}$, corresponds to a time value representative of a transmission time of the $i^{th}$ ideal slot position of said set of ideal slot positions and every ideal slot position $I_j$, where $j \in \{2, 3, \ldots N\}$, is spaced apart from ideal slot position $I_{j-1}$ by a time substantially equal to said peak packet emission interval, and wherein said set of ideal slot positions and said set of assigned slot positions have an ordinal one-to-one correspondence;

(b) selecting a value ME, corresponding to a maximum-valued element of the set $\{I_k\text{-}C_k: k \in \{1, 2, \ldots N\}\}$, and if this is a negative number, setting ME to zero;

(c) selecting a value ML, corresponding to a maximum-valued element of the set $\{C_k\text{-}I_k: k \in \{1, 2, \ldots N\}\}$, and if this is a negative number, setting ML to zero; and (d) comparing the quantity ME+ML against said packet delay variation time and in response thereto concluding whether said packet stream conforms to said predetermined conformance algorithm.

4. The method according to claim 3, wherein said FL slots of said slot scheduling frame have substantially equal fixed time durations and said packet stream comprising packets of a fixed length.

5. Call processing and connection admission control apparatus for use in a packet-switched network node element, said apparatus comprising:

(a) means for assigning to a constant bit rate packet stream a set of N assigned slot positions in a slot scheduling frame having FL slots, where FL≧N;

(b) means for selecting a set of N ideal slot positions for said packet stream wherein said ideal slot positions are spaced apart from each other by a time substantially equal to a peak packet emission interval and wherein said set of N ideal slot positions and said set of N assigned slot positions have an ordinal one-to-one correspondence;

(c) means for determining a value ME, corresponding to a maximum amount by which each assigned slot position of said set of N assigned slot positions is earlier than its corresponding ideal slot position of said set of N ideal slot positions;

(d) means for determining a value ML, corresponding to a maximum amount by which each said assigned slot position is later than its corresponding said ideal slot position; and (e) determining, based on a quantity ME+ML and a packet delay variation time, whether said packet stream conforms to a predetermined conformance algorithm characterized by said peak packet emission interval and said packet delay variation time.

6. The apparatus according to claim 5, wherein said FL slots of said slot scheduling frame have substantially equal fixed time durations and said packet stream comprising packets of a fixed length.

7. Data communication apparatus, comprising:

input means for receiving data packets from a traffic source and for queuing said packets in a memory, said traffic source being associated with a predetermined upper bound of a permissible packet delay variation time;

means for defining a slot scheduling frame having a predetermined frame duration, FD, and a total number of slots, FL, each having substantially equal fixed time durations, and for maintaining a list of free slot positions therein;

means for determining an integer number, $N_{new}$, of said slots needed to satisfy the bandwidth requirements of said traffic source, where $FL \geq N_{new}$;

means for identifying a set of ideal slot positions, $\{I[0], I[1], I[2] \ldots I[N_{new}-1]\}$, for said traffic source which are spaced apart from each other by a time substantially equal to a peak emission interval between said packets;

means for selecting a set of assigned slot positions, $\{VC[0], VC[1], VC[2], \ldots, VC[N_{new}-1]\}$, from said list of free slot positions for said traffic source such that (ME+ML)*FD/FL≦said predetermined upper bound, wherein said set of ideal slot positions and said set of assigned slot positions have an ordinal one-to-one correspondence and wherein ME corresponds to a maximum number of slot positions by which each assigned slot position VC[j]of said set of assigned slot positions is earlier than its corresponding ideal slot position I[j] of said set of ideal slot positions, where j∈{0,1, 2, . . . $N_{new}-1$}, and ML corresponds to a maximum number of slot positions by which each said assigned slot position VC[k] is later than its corresponding said ideal slot position I[k], where k∈{0,1, 2, . . . $N_{new}-1$}; and output means for retrieving queued packets of said traffic source from said memory and transmitting said queued packets only during time periods corresponding to said assigned slot positions.

8. The apparatus according to claim 7, wherein said packets have fixed length.

9. A data transmission method comprising:

defining a repeating slot scheduling frame having a predetermined frame duration, FD, and a total number of slots, FL, each having substantially equal fixed time durations;

maintaining an ordered list of free slot positions in said scheduling frame;

determining an integer number, $N_{new}$, of said slots needed to satisfy the bandwidth requirement of a traffic source, where $FL \geq N_{new}$ and wherein said traffic source is associated with a predetermined upper bound of a permissible packet delay variation time;

identifying a set of ideal slot positions, $\{I[0], I[1], I[2] \ldots I[N_{new}-1]\}$, for said traffic source which are spaced apart from each other by a time substantially equal to a peak emission interval between data packets of said traffic source;

selecting a set of assigned slot positions, $\{VC[0], VC[1], VC[2], \ldots, VC[N_{new}-1]\}$, from said list of free slot positions for said traffic source such that (ME+ML)*FD/FL≦said predetermined upper bound, wherein said set of ideal slot positions and said set of assigned slot positions have an ordinal one-to-one correspondence and wherein ME corresponds to a maximum number of slot positions by which each assigned slot position VC[j] of said set of assigned slot positions is earlier than its corresponding ideal slot position I[j] of said set of ideal slot positions, where j∈{0,1, 2, . . . $N_{new}-1$}, and ML corresponds to a maximum number of slot positions by which each said assigned slot position VC[k] is later than its corresponding said ideal slot position I[k], where k∈{0, 1, 2, . . . $N_{new}-1$}; and transmitting said packets only during time periods corresponding to said assigned slot positions.

10. The method according to claim 9, wherein said packets have a fixed length.

11. Data communication apparatus, comprising:

input means for receiving packets from a traffic source and for queuing said packets in a memory;

means for defining a slot scheduling frame having a predetermined frame duration, FD, and a total number of slots, FL, and for maintaining an ordered list of free slot positions therein;

means for determining an integer number, $N_{new}$, of said slots needed to satisfy the bandwidth requirement of said traffic source, where $FL \geq N$;

means for identifying a set of ideal slot positions, $\{I[0], I[1], I[2] \ldots I[N_{new}-1]\}$, for said traffic source which are spaced apart from each other by a time substantially equal to a peak emission interval between said packets;

means for selecting a set of assigned slot positions, $\{VC[0], VC[1], VC[2], \ldots, VC[N_{new}-1]\}$, from said list of free slot positions for said traffic source, wherein said set of ideal slot positions and said set of assigned slot positions have an ordinal one-to-one correspondence and wherein each assigned slot position of said set of assigned slot positions has a position which is approximate or equal to, respectively, its corresponding ideal slot position of said set of ideal slot positions, and wherein each VC[i], where i∈{1,2, . . . $N_{new}-1$}, is selected from said list of free slot positions so as not to increase the overall burstiness of said traffic source, and in the event such a free slot position of said list of free slot positions does not exist for a given VC[i], the said VC[i] is selected from said list of free slot positions so as to least increase the overall burstiness of said traffic source; and output means for retrieving queued packets of said traffic source from said memory and transmitting said queued packets only during time periods corresponding to said assigned slot positions.

12. The apparatus according to claim 11, wherein said slots of said slot scheduling frame each have substantially equal fixed time durations, and wherein said overall burstiness of said traffic source is defined by a quantity (ME+ML)*FD/FL, wherein ME corresponds to a maximum number of slot positions by which each said assigned slot position VC[j] is earlier than its corresponding said ideal slot position I[j], where $j \in \{0,1, 2, \ldots N_{new}-1\}$, and ML corresponds to a maximum number of slot positions by which each said assigned slot position VC[k] is later than its corresponding said ideal slot position I[k], where $k \in \{0,1, 2, \ldots N_{new}-1\}$.

13. The apparatus according to claim 11, wherein said slots of said slot scheduling frame each have substantially equal fixed time durations, and wherein said apparatus including means for computing a quantity (ME+ML)*FD/FL, wherein ME corresponds to a maximum number of slot positions by which each said assigned slot position VC[j] is earlier than its corresponding said ideal slot position I[j], where $j \in \{0,1, 2, \ldots N_{new}-1\}$, ML corresponds to a maximum number of slot positions by which each said assigned slot position VC[k] is later than its corresponding said ideal slot position I[k], where $k \in \{0,1, 2, \ldots N_{new}-1\}$, said quantity (ME+ML)*FD/FL providing an upper bound of a packet delay variation time for said traffic source.

14. The apparatus according to claim 12, wherein said VC[i] is selected from (a) a closest free slot position of said list of free slot positions preceding or equal to I[i] and (b) a closest free slot position receding I[i].

15. The apparatus according to claim 11, wherein a first said ideal slot position, I[0], is a first free slot position of said list of free slot positions.

16. The apparatus according to claim 11, wherein VC[i] is iteratively determined.

17. The apparatus according to claim 12, wherein I[i], VC[i], ML and ME are iteratively determined.

18. The apparatus according to claim 13, wherein I[i], VC[i], ML and ME are iteratively determined.

19. The apparatus according to claim 14, wherein I[i], VC[i], ML and ME are iteratively determined.

20. The apparatus according to claim 19, wherein, when one of (a) said closest free slot position preceding or equal to I[i], (b) said closest free slot position receding I[i] and (c) both said closest free slot position preceding or equal to I[i] and said closest free slot position receding I[i], are respectively not within envelopes defined by ME and ML, VC[i] is allocated said closest free slot position which, when assigned, will minimize the value of ME+ML.

21. The apparatus according to claim 20, wherein said packets have a fixed length.

22. A data transmission method, comprising:
defining a repeating slot scheduling frame having a predetermined frame duration, FD, and a total number of slots, FL;
maintaining an ordered list of free slot positions in said frame;
determining an integer number, $N_{new}$, of said slots needed to satisfy the bandwidth requirement of a traffic source, where $FL \geq N_{new}$;
identifying a set of ideal slot positions, $\{I[0], I[1], I[2] \ldots I[N_{new}-1]\}$, for said traffic source which are spaced apart from each other by a time substantially equal to a peak emission interval between packets of said traffic source; selecting a set of assigned slot positions, $\{VC[0], VC[1], VC[2], \ldots, VC[N_{new}-1]\}$, from said list of free slot positions for said traffic source, wherein said set of ideal slot positions and said set of assigned slot positions have an ordinal one-to-one correspondence and wherein each assigned slot position of said set of assigned slot positions has a position which is approximate or equal to, respectively, its corresponding ideal slot position of said set of ideal slot positions, and wherein each VC[i], where $i \in \{1,2, \ldots N_{new}-1\}$, is selected from said list of free slot positions so as not to increase the overall burstiness of said traffic source, and in the event such a free slot position of said list of free slot positions does not exist for a given VC[i], the said VC[i] is selected from said list of free slot positions so as to least increase the overall burstiness of said traffic source; and transmitting said packets only during time periods corresponding to said assigned slot positions.

23. The method according to claim 22, wherein said overall burstiness of said traffic source is defined by a quantity ME+ML, wherein ME is a time equivalent to a maximum number of slot positions by which each said assigned slot position VC[j] is earlier than its corresponding said ideal slot position I[j], where $j \in \{0,1, 2, \ldots N_{new}-1\}$, and ML is a time equivalent to a maximum number of slot positions by which each said assigned slot position VC[k] is later than its corresponding said ideal slot position I[k], where $k \in \{0,1, 2, \ldots N_{new}-1\}$.

24. The method according to claim 22, including means for computing a quantity ME+ML, wherein ME is a time equivalent to a maximum number of slot positions by which each said assigned slot position VC[j] is earlier than its corresponding said ideal slot position I[j], where $j \in \{0,1, 2, \ldots N_{new}-1\}$, ML is a time equivalent to a maximum number of slot positions by which each said assigned slot position VC[k] is later than its corresponding said ideal slot position I[k], where $k \in \{0,1, 2, \ldots N_{new}-1\}$, said quantity ME+ML providing an upper bound of a packet delay variation time for said traffic source.

25. The method according to claim 23, wherein said VC[i] is selected from (a) a closest free slot position of said list of free slot positions preceding or equal to I[i] and (b) a closest free slot position receding I[i].

26. The method according to claim 22, wherein a first said ideal slot position I[0] is a first free slot position of said list of free slot positions.

27. The method according to claim 22, wherein VC[i] is iteratively determined.

28. The method according to claim 23, wherein I[i], VC[i], ML and ME are iteratively determined.

29. The method according to claim 24, wherein I[i], VC[i], ML and ME are iteratively determined.

30. The method according to claim 25, wherein I[i], VC[i], ML and ME are iteratively determined.

31. The method according to claim 30, wherein, when one of (a) said closest free slot position preceding or equal to I[i], (b) said closest free slot position receding I[i] and (c) both said closest free slot position preceding or equal to I[i] and said closest free slot position receding I[i], are respectively not within envelopes defined by ME and ML, VC[i] is allocated said closest free slot position which, when assigned, will minimize the value of ME+ML.

32. The method according to claim 2, wherein said predetermined conformance algorithm is a generic cell rate algorithm.

33. The method according to claim 4, wherein said predetermined conformance algorithm is a generic cell rate algorithm.

34. The method according to claim 6, wherein said predetermined conformance algorithm is a generic cell rate algorithm.

35. The method according to claim 1, wherein said value ME is a maximum amount of time by which each said assigned slot position is earlier than its said respective ideal slot position, said value ML is a maximum amount of time by which each said assigned slot position is later than its said respective ideal slot position, and determining whether said packet stream conforms to said predetermined conformance algorithm is performed by comparing the quantity ME+ML and said packet delay variation time.

36. The method according to claim 2, wherein said value ME is a maximum number of slot positions by which each said assigned slot position is earlier than its said respective ideal slot position and said value ML is a maximum number of slot positions by which each said assigned slot position is later than its said respective ideal slot position.

37. The method according to claim 5, wherein said value ME is a maximum amount of time by which each said assigned slot position is earlier than its said respective ideal slot position, said value ML is a maximum amount of time by which each said assigned slot position is later than its said respective ideal slot position, and determining whether said packet stream conforms to said predetermined conformance algorithm is performed by comparing said quantity ME+ML and said packet delay variation time.

38. The method according to claim 6, wherein said value ME is a maximum number of slot positions by which each said assigned slot position is earlier than its said respective ideal slot position and said value ML is a maximum number of slot positions by which each said assigned slot position is later than its said respective ideal slot position.

* * * * *